(12) United States Patent
Marzorati et al.

(10) Patent No.: US 12,346,741 B2
(45) Date of Patent: Jul. 1, 2025

(54) COMPUTING ENVIRONMENT PROVISIONING

(71) Applicant: Kyndryl, Inc., New York, NY (US)

(72) Inventors: Mauro Marzorati, Lutz, FL (US);
Shikhar Kwatra, San Jose, CA (US);
Shubhi Asthana, Santa Clara, CA (US);
Jeremy R. Fox, Georgetown, TX (US)

(73) Assignee: Kyndryl, Inc., New York, NY (US)

( * ) Notice: Subject to any disclaimer, the term of this patent is extended or adjusted under 35 U.S.C. 154(b) by 561 days.

(21) Appl. No.: 17/663,029

(22) Filed: May 12, 2022

(65) Prior Publication Data
US 2023/0367644 A1 Nov. 16, 2023

(51) Int. Cl.
G06F 9/50 (2006.01)
G06F 9/355 (2018.01)
G06F 16/334 (2025.01)

(52) U.S. Cl.
CPC .......... *G06F 9/5072* (2013.01); *G06F 9/3555* (2013.01); *G06F 16/3344* (2019.01)

(58) Field of Classification Search
None
See application file for complete search history.

(56) References Cited

U.S. PATENT DOCUMENTS

| | | | |
|---|---|---|---|
| 8,316,125 B2 | 11/2012 | DeHaan | |
| 9,098,364 B2 | 8/2015 | Davis | |
| 9,282,166 B2 | 3/2016 | Markley et al. | |
| 10,244,081 B2 | 3/2019 | Anan | |
| 2019/0163787 A1 | 5/2019 | Andrews et al. | |
| 2020/0004582 A1* | 1/2020 | Fornash | G06F 9/4856 |
| 2020/0110839 A1* | 4/2020 | Wang | G06F 16/335 |
| 2020/0356866 A1 | 11/2020 | Chakrabarty et al. | |
| 2021/0134279 A1* | 5/2021 | Mallenahally | G10L 15/1822 |

(Continued)

FOREIGN PATENT DOCUMENTS

WO WO2019211646 A2 11/2019

OTHER PUBLICATIONS

Kumara, "FOCloud: Feature Model Guided Performance Prediction and Explanation for Deployment Configurable Cloud Applications", IEEE (Year: 2022).*

(Continued)

*Primary Examiner* — Wynuel S Aquino
(74) *Attorney, Agent, or Firm* — CANTOR COLBURN LLP; Erik Swanson

(57) ABSTRACT

Text is received from a user describing item(s) for migration to a computing environment with cloud feature(s), resulting in item description(s), the text including unstructured text that are processed separately. Text mining is performed on the unstructured text to extract item feature(s). For each listing a portion of the unstructured text is extracted, resulting in an extracted text portion for each listing from which an entity is identified. Each entity or item feature is mapped to cloud feature(s) available from solution(s) with cloud feature(s). Based on the cloud feature(s), recommendation(s) are made to the user regarding cloud feature(s) of the solution(s) for optional consideration by the user. Explanation(s) for the recommended cloud feature(s) from explainability model(s) may be provided to the user.

19 Claims, 7 Drawing Sheets

(56) References Cited

U.S. PATENT DOCUMENTS

2022/0182464 A1* 6/2022 Dickens .............. H04L 41/5051
2022/0198223 A1* 6/2022 Espinosa Godinez .......................
G06F 18/24155

OTHER PUBLICATIONS

Hao, W., et al., "Personalized QoS Prediction of Cloud Services via Learning Neighborhood-Based Model", arXiv:1508.04537v1, Aug. 19, 2015, 9 pgs.

"Cognitive Method and System to Automatically Populate a Knowledge Base of Services, to Allow Services Selection, Filtering and Comparing", ip.com, IPCOM000252854D, Feb. 15, 2018, 4 pgs.

Akbulut, B., "All about entities: Dictionaries and Patterns with Watson Assistant (Part 1)", IBM Watson Assistant, Apr. 25, 2019, 7 pgs.

Dhurandhar, A., et al., "Model Agnostic Contrastive Explanations for Machine Learning Classification Models", Dec. 14, 2018, 14 pgs.

Hulstaert, L., "Understanding model predictions with LIME", Towards Data Science, Jul. 11, 2018, Retrieved on May 17, 2021 from the Internet URL: https:towardsdatascience.com/understanding-model-predictions-with-lime-a582fdff3a3b, 6 pgs.

"Multi-Cloud Management Market Size, Share and Global Market Forecast to 2022 | COVID-19 Impact Analysis", MarketsandMarkets. Retrieved on May 12, 2022 from the Internet URL: https://www.marketsandmarkets.com/Market-Reports/multi-cloud-management-market-1860020.html, 9 pgs.

Watson Health Perspectives—Internet URL: https://www.ibm.com/blogs/watson-health/clinical-trial-matching-data-issues-artificial-intelligence, 6 pgs.

Scalability—Wikipedia, last edited Aug. 4, 2021, https://en.wikipedia.org/wiki/Scalability, 4 pgs.

* cited by examiner

COMPUTING ENVIRONMENT PROVISIONING

BACKGROUND

Many kinds of small-businesses that prefer daily publish-only newspapers, schools, small daycares, etc., want or need to migrate to a different computing environment. However, most of them do not have the necessary IT knowledge regarding the kind of cloud platform they are looking for—IaaS, PaaS or SaaS and the intricacies involved with each.

There are functionalities of a cloud service that should be considered including, for example: Real-Time availability; Streaming; User Experience; and Scalable Data storage to name a few. Also, one needs to understand the features of the business, in order to recommend the optimal cloud configurations that would suit the business needs.

SUMMARY

Shortcomings of the prior art are overcome, and additional advantages are provided through the provision of a computer-implemented method. The method includes: receiving text from a user describing at least one item for migration to a computing environment with one or more cloud feature, resulting in one or more item description, wherein the text comprises unstructured text; performing text mining on the unstructured text to extract one or more item feature; extracting one or more portion of the unstructured text, resulting in at least one extracted text portion; identifying, from each of the at least one extracted text portion, a corresponding entity, resulting in one or more entity; mapping one of the one or more entity and the one or more item feature to one or more of a plurality of cloud features available from one or more solution with cloud feature(s), resulting in one or more mapped cloud feature; and based on the one or more mapped cloud feature, automatically recommending to the user at least one of the one or more mapped cloud feature, resulting in at least one recommended cloud feature for optional consideration by the user.

In another aspect, a system can be provided. The system includes: a memory; and processor(s) in communication with the memory; and program instructions executable by the processor(s) via the memory to perform a method. The method includes: receiving text from a user describing at least one item for migration to a computing environment with one or more cloud feature, resulting in one or more item description, wherein the text comprises unstructured text; performing text mining on the unstructured text to extract one or more item feature; extracting one or more portion of the unstructured text, resulting in at least one extracted text portion; identifying, from each of the at least one extracted text portion, a corresponding entity, resulting in one or more entity; mapping one of the one or more entity and the one or more item feature to one or more of a plurality of cloud features available from one or more solution with cloud feature(s), resulting in one or more mapped cloud feature; and based on the one or more mapped cloud feature, automatically recommending to the user at least one of the one or more mapped cloud feature, resulting in at least one recommended cloud feature for optional consideration by the user.

In a further aspect, a computer program product can be provided. The computer program product includes a computer readable storage medium readable by one or more processor and storing instructions for execution by the one or more processor for performing a method. The method includes: receiving text from a user describing at least one item for migration to a computing environment with one or more cloud feature, resulting in one or more item description, wherein the text comprises unstructured text; performing text mining on the unstructured text to extract one or more item feature; extracting one or more portion of the unstructured text, resulting in at least one extracted text portion; identifying, from each of the at least one extracted text portion, a corresponding entity, resulting in one or more entity; mapping one of the one or more entity and the one or more item feature to one or more of a plurality of cloud features available from one or more solution with cloud feature(s), resulting in one or more mapped cloud feature; and based on the one or more mapped cloud feature, automatically recommending to the user at least one of the one or more mapped cloud feature, resulting in at least one recommended cloud feature for optional consideration by the user.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
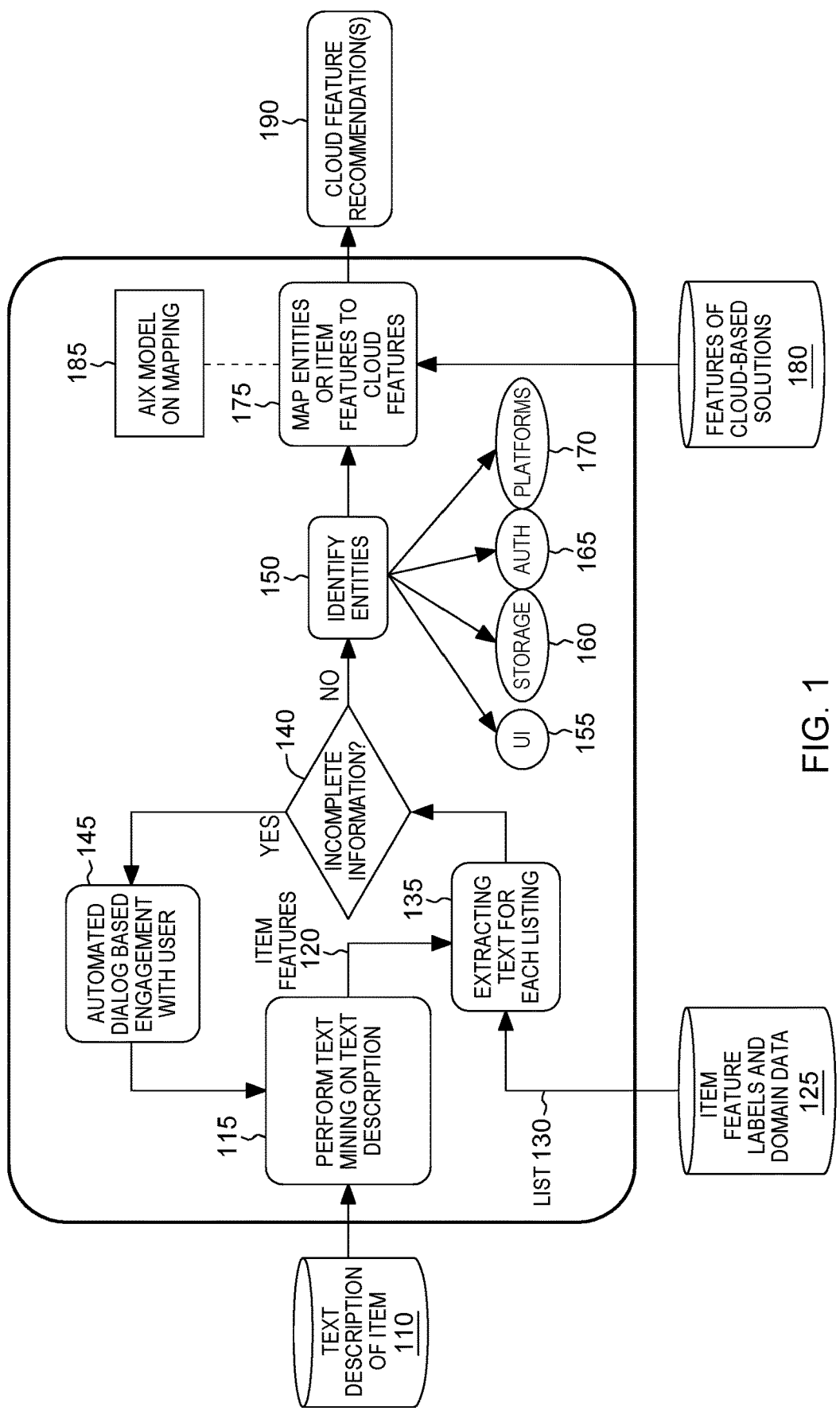
FIG. 1 is a hybrid block/flow diagram for one example of a process, in accordance with one or more aspect of the present invention.

Disclosed is a method, system and program product for providing recommendations of available cloud features from various solutions of service providers for optional consideration by a user. The recommendations are based on text (alphanumeric characters) received from the user describing item(s) (e.g., an application) for possible migration to a different computing environment, for example, with cloud feature(s), the text including structured and unstructured text. Using text mining, feature(s) of the item(s) are extracted. Text portions are also extracted to identify entity(ies), which is described in more detail below. The entity(ies) or the item feature(s) are mapped to available cloud feature(s) of cloud solution(s) from cloud service provider(s). One, some or all of the mapped cloud features may then be automatically recommended to the user for optional consideration with regard to migration to a different computing environment, for example, a computing environment with cloud features. The recommended features may, for example, be mixed and matched from different cloud service providers and/or different cloud solutions from the same cloud service provider. The recommendation may be validated against explainability model(s), for example, Local Interpretable Machine Explainability (LIME), prior to sending to the user, the validation using a data store of known limitations and performance degradation for solutions with cloud feature(s) associated with the recommended cloud features. In one example, the method further includes processing the structured text and the unstructured text separately and preparing, from the unstructured text, a list of labels for the item feature(s) and domain data. Tag(s) are identified for each of the item feature(s) and each of the item feature(s) are labelled with the tag(s). The extracting includes, for example, extracting, for each listing on the list, a portion of the unstructured text, resulting in an extracted text portion for each listing. In one example, if a given listing on the list results in no text portion being extracted, the method further includes, for example, automatedly communicating with the user to match a corresponding text portion with the given listing.

Intents and entities are the building blocks of natural language understanding (previously referred to as "Natural Language Processing") or NLP: The terms may be used interchangeably for purposes of the present invention. Intents are the goals a user is trying to accomplish. A model can be trained to detect intents by providing examples of what the users would say (sometimes called "user utterances") to express that intent or goal. Entities are concepts or objects that matter to the tasks the model can perform.

In the context of the present invention, identifying an entity in unstructured text describing an item (e.g., an application) includes preparing a list of label(s), domain data and feature(s) of the item, the list having multiple listings. For each listing in the list, a predetermined amount of the unstructured text that includes a given listing, i.e., a label, domain data or an item feature, is extracted, for example, a paragraph, page or a number of words surrounding the listing. To understand the context of each extracted portion of the unstructured text, natural language processing can be applied. Given this context, an entity can be predicted for each unstructured text portion.

In one example, users want to buy office supplies from an online store. The store's automated assistant needs to understand a user's intent, as well as understand what the user wants to purchase, which can be modeled with an entity.

A defined entity requires a name and a list all the "synonyms" a user might use to refer to it. For example, assume the online store is selling two types of office supplies: pens and notebooks. An entity for this situation can be defined with a name and two "values" of type "synonym."

When an entity value is defined as a "dictionary," by selecting a "synonym" type, an exact match of synonyms can be used to recognize the entity. In some implementations, the name of the value (e.g., "notebook" or "pen") can be included as one of the synonyms.

To test the entity definition, consider the following user utterance, "I want to buy a ballpoint pen." In some implementations, "ballpoint pen" may be recognized as an entity. After recognizing the entity, the entity and value that match the synonym may be returned.

An entity and its values effectively provide a hierarchy that is one level deep in this example: Entity (e.g., name) is the parent, and values (e.g., @name:notebook) are the children. Synonyms of each value (e.g., "workbook" and "pad") are different ways a user may mention an entity value. One advantage of this hierarchy is the ability to condition a dialog using the entity or each of its child values. This hierarchy can also be useful when adding examples to your intents. In some cases an assistant can allow one to directly reference an entity name in the user examples of intents. Using direct entity references can improve the performance of intent classification.

Sometimes entities can be expressed concisely with patterns. For example, phone numbers, product IDs, or credit card numbers often follow a well-defined pattern. Regular expressions may be used to define pattern entity values and teach the model how to recognize such entities.

Consider a scenario where the client or customer ("user") wants to find a multi-provider solution with cloud feature(s) for their Business Intelligence (BI) application. The user may find different solutions if they research online: for IaaS (Infrastructure-as-a-Service), one can take a solution and use some proprietary BI solution; for PaaS (Platform-as-a-Service), one can pick a provider solution or another provider solution; and for SaaS (Software-as-a-Service), one can pick a provider solution.

The user may have to evaluate all these solutions one by one, and search for the features in one or multiple solutions that fit its needs. The user may also need to understand the features or controls that drive the solution including cost, RAM, storage space, coverage of service, performance, etc. The user may also need to normalize the features (e.g. RAM vs memory) across the several offerings, along with pricing structures. It is tedious and takes a long time to compare all the features. The importance criteria will vary from business to business and client to client.

However, if one goes through all the features, one can come up with a common list of features across many of the solutions. The user, at this point, may want or need to generate, for example, a mapping between these common features and entities or the remaining features or special features that they want within their cloud service agreement. For instance, if a number of users is a common feature and RAM is an uncommon feature, a mapping between users and RAM, or memory would be helpful.

FIG. 1 is a hybrid block diagram and flow diagram for one example of one or more aspects of the present invention. A text-based alphanumeric ("text") description of an item being considered by a user for possible migration to a different computing environment, for example, a computing environment with cloud features, is stored in storage 110. At least a portion of the description includes unstructured text and may also include structured text. Where the description includes both structured and unstructured text, they are processed separately. Any structured text can be conventionally processed. Text mining is performed 115 on the unstructured text to extract item feature(s) 120. Item feature labels and domain data, which may, for example, be stored in storage 125, are made into a list 130 for use in extracting 135 a portion of the text for each listing. In one example, the portions are predetermined, e.g., a paragraph that includes a given listing. An inquiry 140 is made as to whether the extraction, for a given listing, resulted in no extracted text portion. If so, the system invokes an automated dialog 145 with the user to find a text portion for the given listing. If there was no unmatched listing, the system begins to identify 150 entities from the extracted text portions. Further details are provided regarding identifying entities in the FIG. 2 description and following text. In the example of FIG. 1, entities "UI" or User Interface (155), "Storage" (160), "Auth" (authorization) for users to use the solution(s) with cloud feature(s) on the chosen platform (165) and "Cloud Platforms" (170). Having identified the entities, the system maps 175 the entities to available cloud features of various cloud solutions from various cloud providers stored, for example, in storage 180. In another embodiment, the item feature(s) may instead be mapped to the available cloud features. The mapping aspect employs, for example, an Artificial Intelligence eXplainability (AIX) model 185. The mapped cloud feature(s) are then used to provide cloud feature recommendation(s) 190 to the user for optional consideration thereby.

In one embodiment, the available cloud features and providers may be predetermined. Successful mappings of an entity or an item feature with a cloud feature may be stored, for example, in a mappings database. With such a database, machine learning can be employed using the mappings in the database, for example, periodically, to iteratively improve future mappings and, hence, the cloud feature recommendation based there on.

Typical human-generated unstructured data includes: text files: word processing, spreadsheets, presentations, emails, logs, etc. Email has some internal structure thanks to its metadata, and we sometimes refer to it as semi-structured. However, its message field is unstructured and traditional analytics tools cannot parse it. Human-generated unstructured data also includes, for example, social media, photo sharing sites; and mobile data, such as, for example, text messages and locations.

Typical machine-generated unstructured data includes: satellite imagery: weather data, landforms, military movements; scientific data: oil and gas exploration, space exploration, seismic imagery, atmospheric data; digital surveillance; surveillance photos and video; and sensor data: traffic, weather, oceanographic sensors.

Structured data usually resides in relational databases (RDBMS). Fields store length-delineated data like phone numbers, Social Security numbers, or ZIP codes. Records even contain text strings of variable length like names, making it a simple matter to search. Data may be human- or machine-generated, as long as the data is created within an RDBMS structure. This format is eminently searchable, both with human-generated queries and via algorithms using types of data and field names, such as alphabetical or numeric, currency, or date.

Common relational database applications with structured data include airline reservation systems, inventory control, sales transactions, and ATM (Automated Teller Machine) activity.

Figure 2:
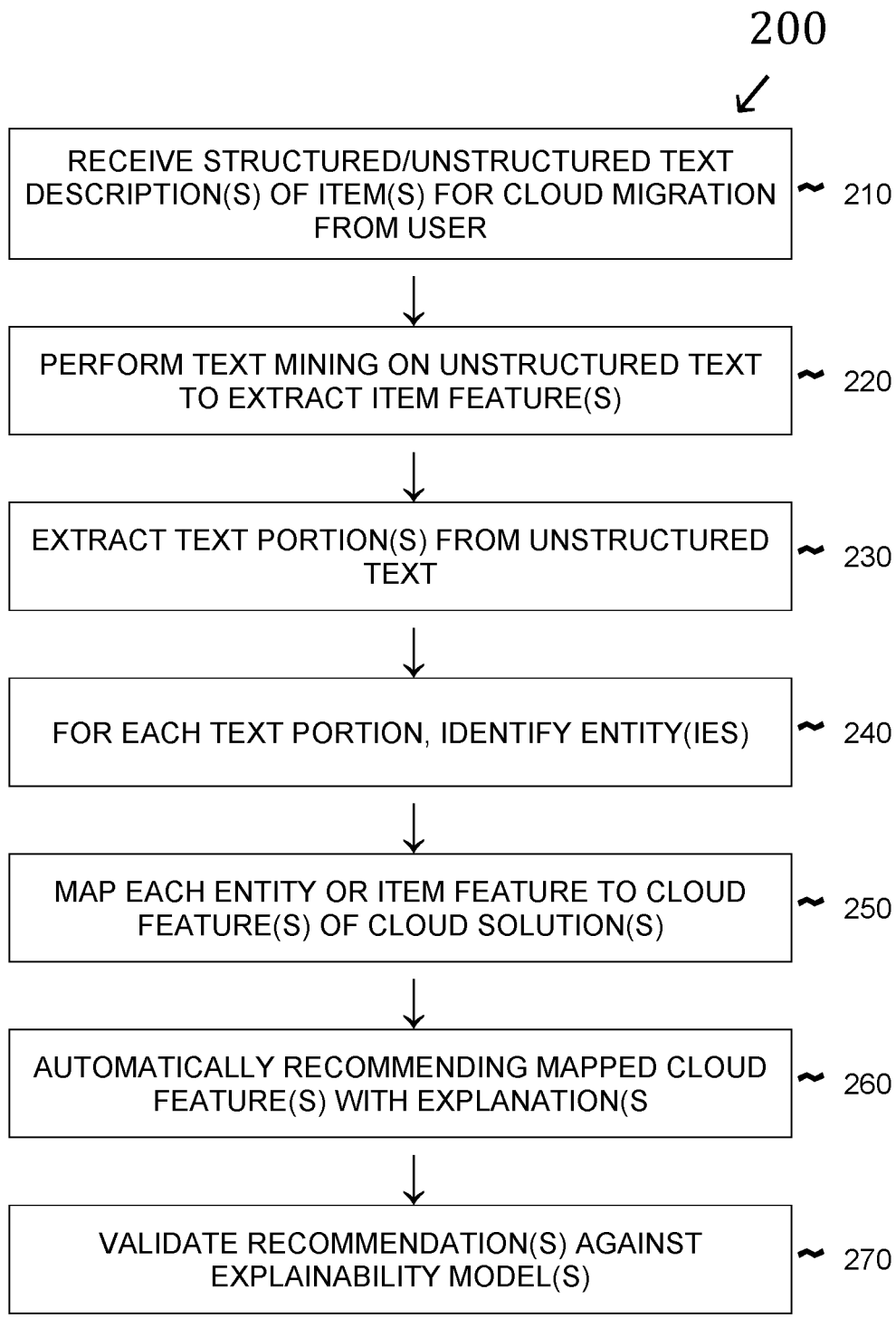
FIG. 2 is a flow diagram for one example of a method of recommending cloud features, in accordance with one or more aspect of the present invention.

FIG. 2 is a flow diagram 200 for one example of a computer-implemented method of providing one or more recommendation for cloud feature(s) of available cloud provider(s) solution(s) (or just "cloud solution(s)") for optional consideration by a customer or client ("user") in making a work or employment related decision. The recommendation(s) are based on a description (e.g., alphanumeric characters) of an item(s) the user is considering to migrate to, or otherwise launch on, cloud provider network(s). The item(s) may include the following non-limiting examples: an application; an agreement (e.g., a cloud service provider agreement); a service; and a business process.

In the method, received 210 from the user is unstructured and structured alphanumeric-character-based ("text") description(s) of an item(s) for possible migration to a different computing environment, for example, a computing environment with cloud features. For the unstructured text, text mining is performed 220 to extract item feature(s). In one embodiment, the item feature(s) also include one or more item feature requested by the user. The method also extracts 230 text portion(s) of the unstructured text. The amount of unstructured text extracted may be, for example, predetermined (e.g., a paragraph or other section) may be extracted. From each extracted portion of unstructured text, one or more entity is identified, 240. In one example, Natural Language Processing (NLP) may be used on the extracted portion to predict the entity or entities. In one example, a Common Bag of Words (CBOW) technique may be used. In such a CBOW technique, a context from the extracted portion is used to predict the word(s), i.e., the entity or entities. Each item feature or entity may then be mapped 250 to cloud feature(s) of available solution(s) with cloud feature(s). Once we have item feature(s) or entity(ies), the item feature(s) or entity(ies) are mapped to the cloud feature(s) of available cloud solution(s). The mapping, in one non-limiting example, uses a predetermined list of available cloud features of various cloud solutions. Mapping of the item feature(s) or the entity(ies) to cloud feature(s) available from cloud solution(s) may then be done. In one example, a threshold for the item feature(s) may be used. For instance, if the user needs an application to support fifty users, an application may be chosen that has a storage capacity of approximately 50 GB to store data for these users. At this point, a recommendation(s) 260 may be automatically provided to the user based on the mapped cloud feature(s). In one embodiment, the recommendation(s) may first be validated 270, for example, against an explainability model(s). Once validated, the recommendation(s) may be provided to the user for optional consideration, including an explanation(s) to the user, i.e., provide the reasoning for the particular recommendation(s), which reasoning is the output of the explainability model and, in one example, may take the form of a cloud feature importance score.

The mapping model considers a common list of features across the cloud-based service providers of the solution(s) with cloud feature(s). In one example, there are special features that may be used to map to the application features. A set of common features that is considered for mapping include those in Table A for an application below (as noted above, the mapping may instead be entity(ies) versus the item feature(s)):

TABLE A

| Application features | Cloud features |
|---|---|
| Number of Users | Number of Users, bandwidth of cloud |
| Geography of Users | Cloud services provision geography wise |

TABLE A-continued

| Application features | Cloud features |
| --- | --- |
| Application software platform | Cloud support for software platform |
| Budget for cost of cloud service | Cost of cloud service |
| Expected Quality of Services (QoS) from cloud application | Average QoS of cloud service |
| Security encryption level expected | Security encryption level provided by cloud |
| Coverage in terms of usage expected | Coverage provided by cloud service provider |
| Data encryption | Cloud service provided data encryption |
| Memory estimated for application usage and storage of data | Cloud service provided memory |
| Authentication type | Authentication provided by Cloud provider |
| LDAP services requirement | LDAP services by cloud provider |
| Number of instances support for application | Scalability of cloud |
| Reliability requirement of application | Reliability provided by cloud provider. |
| Dependencies on $3^{rd}$ party applications | Cloud services provider support for integration with other applications |

Special features that can be considered for mapping include those in Table B below:

TABLE B

| Architectural flexibility of application | Scalability and infrastructure support by cloud provider |
| --- | --- |
| Modernization and feature upgrades expected | Modernization of cloud service |
| Constraint where applications cannot be under the same provider or same geography | Cloud services requirements |
| Applications that require specialized hardware to function | Cloud services provider support |

A database of mapping may be used and iteratively enhanced based on successfully mapped application features or entities to cloud provider solution features.

The system can run an NLP process to, for example, process data for preparation of records that are stored in a data repository and for other purposes. The system can run a Natural Language Processing (NLP) process for determining one or more NLP output parameter of, for example, an item being considered for migration to a different computing environment, for example, a computing environment with cloud features. The NLP process can include one or more of a topic classification process that determines topics of messages and output one or more topic NLP output parameter, a sentiment analysis process which determines sentiment parameter for a message, e.g., polar sentiment NLP output parameters, "negative," "positive," and/or non-polar NLP output sentiment parameters, e.g., "anger," "disgust," "fear," "joy," and/or "sadness" or other classification process for output of one or more other NLP output parameters, e.g., one of more "social tendency" NLP output parameter or one or more "writing style" NLP output parameter.

By running an NLP process, the system can perform a number of processes including one or more of: (a) topic classification and output of one or more topic NLP output parameter for a received text describing an item(s) for possible cloud migration; (b) sentiment classification and output of one or more sentiment NLP output parameter for a received text; and (c) other NLP classifications and output of one or more other NLP output parameter for the received text.

Topic analysis for topic classification and output of NLP output parameters can include topic segmentation to identify several topics within a text-based document. Topic analysis can apply a variety of technologies e.g., one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment sentiment analysis can classify the polarity of a given text as to whether an expressed opinion is positive, negative, or neutral. Advanced sentiment classification can classify beyond a polarity of a given portion of text. Advanced sentiment classification can classify emotional states as sentiment classifications. Sentiment classifications can include the classification of "anger," "disgust," "fear," "joy," and "sadness."

The system running an NLP process can include returning NLP output parameters in addition to those specification topic and sentiment, e.g., can provide sentence segmentation tags, and part of speech tags. The system can use sentence segmentation parameters to determine, e.g., that an action topic and an entity topic are referenced in a common sentence for example.

Figure 6:
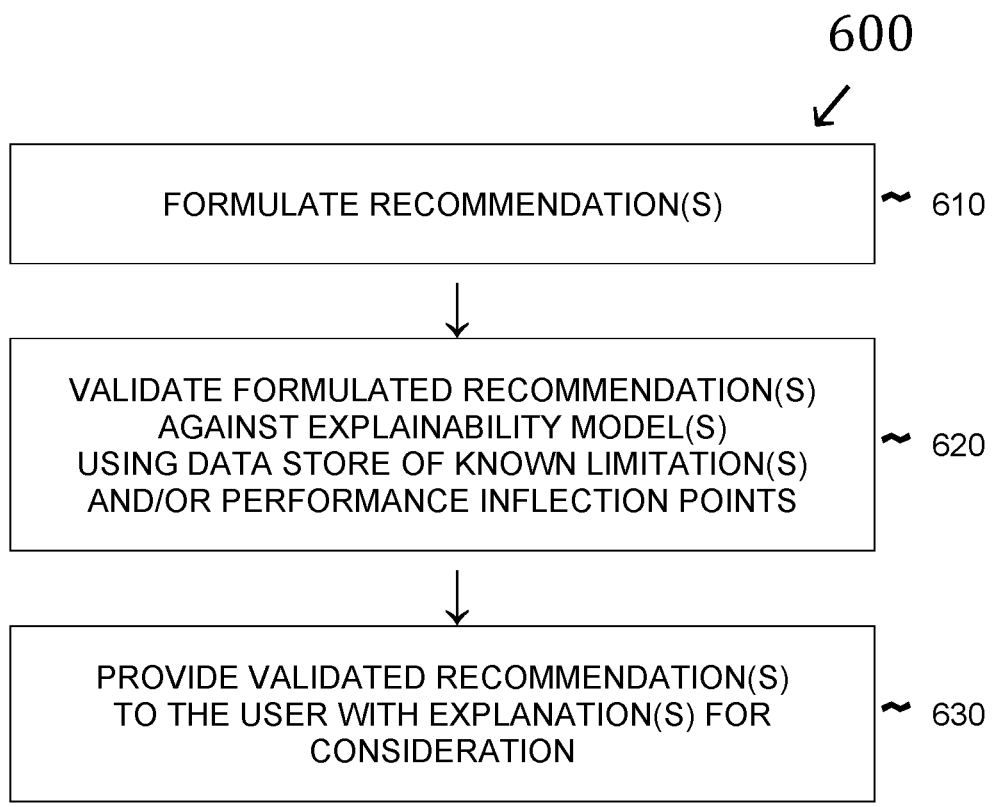
FIG. 6 is a flow diagram for one example of providing cloud feature recommendation(s) with explanation(s) for the recommendation(s), to the user for optional consideration, in accordance with one or more aspect of the present invention.

FIG. 6 is a flow diagram 600 for one example of a method of automatically recommending cloud feature(s) to the user for optional consideration in making a work or employment related decision, in accordance with one or more aspect of the present invention. A recommendation(s) may be formulated 610 based on the mapped cloud feature(s). In one embodiment, the formulated recommendation(s) may be validated 620, for example, against an explainability model(s), the output of which explains, in some fashion, why a particular cloud feature was chosen. In one example, the validation against the explainability model(s) may be accomplished using a data store of known limitation(s) and/or inflection points in performance (i.e., degradations in performance for the solution(s) with cloud feature(s)). In one example, a performance degradation may take the form of a maximum number of SSL certificate aliases being exceeded. The Explainability model, which may be, for example, a commercially available service, provides the user an understanding of how the requirements of cloud features were mapped with the extracted item feature(s) or entity(ies) to achieve the recommendation. Once validated, the recommendation(s) may be provided 630 to the user for optional consideration, the recommendation(s) including an explanation(s) to the user.

Based on the above mapping, the information about these metrics may be fed, in one embodiment, to two explainability models, for example, LIME (Local Interpretable Machine Explainability) and Contrastive Explainability. These two models collectively used are perturbing those input features and checks how the output of the recommendation in terms of scaling of cloud features/provider varies due to perturbation around the median and individually for a given user. In other embodiments, one of the models or another may be used.

Post such perturbations, a feature importance score may be assigned to each cloud feature and one or more of them may be provided to the user for their consideration via, for example, a graphical user interface. For example, a rating of different mappings that were most important to least important can be provided. The feature importance score serves as a reasoning for the optimal cloud provider and distribution of cloud features that are necessary to support of the item to the cloud. Given the feature importance scores, the user can readily understand why one cloud feature/provider is chosen over others.

A LIME model may also or instead be used to provide a feature importance score with respect to the outcome of the model. Feature importance is often used to determine which features play an important role in model predictions. A random forest, having multiple decision trees therein, provides one way to determine the most important features in a dataset and are frequently relied on as a 'ground truth explanation' of the dataset.

By investigating which features are used to construct the 'best' trees, it is possible to get an estimate of the feature importance.

Locally Interpretable Model-Agnostic Explanation Method ("LIME") is model-agnostic, meaning that it can be applied to any machine learning model. LIME also explains model predictions at the data sample level, allowing end-users to interpret these predictions and take actions based on them. The technique attempts to understand the model by perturbing the input of data samples and understanding how the predictions change. LIME assumes a black box machine learning model and investigates the relationship between input and output, represented by the model.

LIME provides local model interpretability. LIME modifies a single data sample by tweaking the feature values and observes the resulting impact on the output. Often, this is also related to what humans are interested in when observing the output of a model, i.e., why a prediction is made or which variables caused the prediction.

One requirement is for LIME to work with an interpretable representation of the input, that is understandable to humans. Examples of interpretable representations include, for example, a Bag of Words (BoW) vector for NLP.

The output of LIME is a list of explanations, reflecting the contribution of each feature to the prediction of a data sample. This provides local interpretability and allows one to determine which feature changes will have the most impact on the prediction.

An explanation is created by approximating the underlying model locally by an interpretable one. Interpretable models are, for example, linear models with strong regularization, decision trees, etc. The interpretable models are trained on small perturbations of the original instance and should only provide a good local approximation. The 'dataset' is created by, for example, adding noise to continuous features on removing words. By only approximating the black-box locally (in the neighborhood of the data sample), the task is significantly simplified.

In another embodiment, a Contrastive Explainability model may be used to provide positive and negative pertinent scores. Given the wide spread use of deep networks across various applications and their black box nature, explainability in artificial intelligence (XAI) has been one of the problems at the forefront in AI research.

Locally interpretable model-agnostic explanation method (LIME) is amongst the few interpretability methods that can provide local explanations for any model with just oracle access. In other words, LIME just needs to be able to query the classification model and based on its outputs can generate an explanation. This is an extremely attractive feature as it can be used in settings where the model owner may not want to expose the inner details of the model but may desire local explanations using say a remote service. Another application is that the method can be used to interpret decisions not just of neural networks but other models such as random forests, boosted trees and ensembles of heterogeneous models which are known to perform quite well in many domains that use structured data.

The model agnostic contrastive explanations method (MACEM) requires only oracle or query access to the classification model. Contrastive explanations are a rich form of explanation where one conveys not only what is (minimally) sufficient to justify the class of an input, i.e., pertinent positives (PPs), but also what should be (minimally) necessarily absent to maintain the original classification, i.e., pertinent negatives (PNs). For example, a patient with symptoms of cough, cold and fever (PPs) could have flu or pneumonia. However, the absence of chills or mucous (PNs) would indicate that the person has flu rather than pneumonia. Thus, in addition to the symptoms that were present, the symptoms that are absent are also used in arriving at a decision.

To compute PPs and PNs one needs to know what it means for a feature to be absent. In other words, what value for a feature indicates that there is no signal or is essentially the least interesting value for that feature. Such values as base values. Previously, the value 0 for a feature was considered as the base value, with positive deviation from it being indicative of more interesting values or values that have more signal. However, this may not be the case for many features especially those that are categorical.

The MACEM Method will now be described. Let X denote the feasible data space and let $(x_0, t_0)$ denote an example $x_0 \in X$ and its inferred class label to obtained from a black-box classification model. The modified example $x \in X$ based on $x_0$ is defined as $x=x_0+\delta$, where $\delta$ is a perturbation applied to $x_0$. Finding pertinent positives/negatives is formulated as an optimization problem over the perturbation variable $\delta$ that is used to explain the model's prediction results. The prediction of the model is denoted on the example x by Pred(x), where Pred(•) is any function that outputs a vector of confidence scores over all classes, such as the log value of prediction probability.

Pertinent positives will now be addressed. Assume an example $x_0$ has d has d features each with base values $\{b_i\}_{i=1}^{d}$. Let $\Delta_{PP}$ denote the space $\{\delta:|x_0+\delta-b|\leq|x_0-b|$ and $x_0+\delta \in X\}$, where $b=[b_1, \ldots, b_d]$, and |•| and ≤implies element-wise absolute value and inequality, respectively. To solve for PP, the following problem formulation was proposed:

$$\min_{\delta \in \Delta pp} c \cdot f_\kappa^{pos}(x_0, \delta) + \beta \|x_0 + \delta - b\|_1 + \|x_0 + \delta - b\|_2^2 + \quad (1)$$

$$\gamma \|x_0 + \delta - AE(x_0 + \delta)\|_2^2. \quad (2)$$

The first term $f_\kappa^{pos}$ is a designed loss function that encourages the modified example $x = x_0 + \delta$ relative to the base value vector $b$, defined as $x - b$, to be predicted as the same class as the original top-1 label $t_0 = \arg\max_i [Pred(x_0)]_i$.

The loss function is defined as:

$$f_\kappa^{pos}(x_0, \delta) = \max\left\{ \max_{i \neq t_0} [Pred(x_0 + \delta)]_i - [Pred(x_0 + \delta)]_{t_0}, -\kappa \right\}. \quad (3)$$

The loss function $f_\kappa^{pos}(x_0, \delta)$ is a hinge-like loss and the term $\kappa \geq 0$ controls the gap between $[Pred(x_0 + \delta)]_{t_0}$ and the other most probably class. In particular, the loss attain it minimal value when $[Pred(x_0 + \delta)]_{t_0}$ is K larger than $\max_{i \neq t_0} [Pred(x_0 + \delta)]_i$. The parameter $c \geq 0$ (1) is the regularization coefficient associated with $f_\kappa^{pos}$. The second and third terms in (1) are jointly called the elastic-net regularizer, which aids in selecting a set of highly relevant features from $x - b$, and the parameter $\beta \geq 0$ controls the sparsity of the vector $x - b$. In other words, if the i-th element of $x - b$ is 0, this means the i-th is not significant for constituting PP.

Pertinent negatives will now be addressed. Analogous to PP, for PN let $\Delta_{P\,N}$ denote the space $\{\delta : |x_0 + \delta - b| > |x_0 - b|$ and $x_0 + \delta \in X\}$. To solve for PN, the following problem formulation was proposed:

$$\min_{\delta \in \Delta_{PN}} c \cdot f_\kappa^{neg}(x_0, \delta) + \beta \|\delta\|_1 + \|\delta\|_2^2 + \gamma \|x_0 + \delta - AE(x_0 + \delta)\|_2^2, \quad (4)$$

where $$f_\kappa^{neg}(x_0, \delta) = \max\left\{ [Pred(x_0 + \delta)]_{t_0} - \max_{i \neq t_0} [Pred(x_0 + \delta)]_i, -\kappa \right\}, \quad (5)$$

In other words, for PN, we look to find the least modified changes in $\delta \in \Delta_{P\,N}$, evaluated by the elastic-net loss on $\delta$, such that its addition to $x_0$ leads to a different top-1 prediction from $t_0$.

If the gradient of the designed loss functions for PP and PN with respect to $\delta$ can be obtained, then one can apply a projected fast iterative shrinkage-thresholding algorithm (FISTA) to solve problems (4) and (1). However, in the black-box setting, such gradient is inadmissible. How to get around this problem is addressed below.

FISTA can solve for PP and PN, assuming the gradient is available. FISTA is an efficient solver for optimization problems involving $L_1$ regularization. Take pertinent negative as an example, let $g(\delta) = f_\kappa^{neg}(x_0, \delta) + \|\delta\|_2^2$ denote the objective function of (4) without the $L_1$ regularization term. Given the initial iterate $\delta^{(0)} = 0$, projected FISTA iteratively updates the perturbation I times by:

$$\delta^{(k+1)} = \Pi_{\Delta_{PN}} \{ S_\beta(y^{(k)} - \alpha_k \nabla g(y^{(k)})) \}; \quad (6)$$

$$y^{(k+1)} = \Pi_{\Delta_{PN}} \left\{ \delta^{(k+1)} + \frac{k}{k+3} (\delta^{(k+1)} - \delta^{(k)}) \right\}, \quad (7)$$

where $\|_{\Delta_{PN}}$ denotes the vector projection on the set $\Delta_{PN}$, $\alpha_k$ is the step size, $y^{(k)}$ is a slack variable accounting for momentum acceleration with $y^{(0)} = \delta^{(0)}$, and $S_\beta: \mathbb{R}^p \mapsto \mathbb{R}^p$ is an element-wise shrinkage-thresholding function defined as:

$$[S_\beta(z)]_i = \begin{cases} z_i - \beta, & \text{if } z_i > \beta; \\ 0, & \text{if } |z_i| \leq \beta; \\ z_i + \beta, & \text{if } z_i < -\beta, \end{cases} \quad (8)$$

for any $i \in \{1, \ldots, d\}$. The final perturbation $\delta^{(k*)}$ for pertinent negative analysis is selected from the set $\{\delta^{(k)}\}_{k=1}^I$ such that $f_\kappa^{neg}(x_0, \delta^{(k*)}) = 0$ and $k^* = \arg\min_{k \in \{1, \ldots, I\}} \beta \|\delta\|_1 + \|\delta\|_2^2$. A similar projected FISTA optimization approach is applied to pertinent positive analysis will now be provided.

In the black-box setting, in order to balance the model query complexity and algorithmic convergence rate using zeroth-order optimization, in this paper we use a two-point evaluation based gradient estimator averaged over q different random directions. Specifically, given a scalar function $f(\cdot)$, its gradient at a point $x \in \mathbb{R}^d$ is estimated by $$\hat{\nabla} f(x) = \frac{d}{q\mu} \sum_{j=1}^q \frac{f(x + \mu u_j) - f(x)}{\mu} \cdot u_j, \quad (9)$$

where $\{u_j\}_{j=1}^q$ is a setoff i.i.d. random directions drawn uniformly from a unit sphere, and $\mu > 0$ is a smoothing parameter.

The estimation error between $\hat{\nabla} f(x)$ and the true gradient $\nabla f(x)$ can be analyzed through a smoothed $f_\mu(x) = \mathbb{E}_{u \in U_b}[f(x + \mu u)]$, where $U_b$ a uniform distribution over the unit Euclidean ball. Assume $f$ is an L-smooth function, that is, its gradient $\nabla f$ is L-Lipschitz continuous. It has been shown that $\hat{\nabla} f(x)$ is an unbiased estimator of the gradient $\nabla f_\mu(x)$, i.e., $\mathbb{E}_u[\hat{\nabla} f(x)] = \hat{\nabla} f(x)$. Moreover, using the bounded error between $f$ and $f_\mu$, one can show that the mean squared error between $\hat{\nabla} f(x)$ and $\nabla f(x)$ is upper bound by:

$$\mathbb{E}_u \left[ \|\hat{\nabla} f(x) - \nabla f(x)\|_2^2 \right] \leq O\left(\frac{q+d}{q}\right) \|\nabla f(x)\|_2^2 + O(\mu^2 L^2 d^2). \quad (10)$$

Ideally, base values as well as allowed ranges or limits for all features are specified by the user before running the method to obtain contrastive explanations. This should in all likelihood provide the most useful explanations. However, this may not always be feasible given the dimensionality of the data and the level of expertise of the user. In such situations, base values may be determined using best judgment.

For real valued features, the base value may be set to be the median value of the feature. This without knowing anything more about the feature is possibly the least interesting value for that feature. Moreover, medians are known to be robust to outliers and are thus preferable to using means. They also are a point estimate that has minimum $L_1$ error with regard to the values for that feature. Medians also make intuitive sense where for sparse features, 0 would rightly be chosen as the base value as opposed to some other value which would be the case for means.

For categorical features, the base value is set to be the mode or most frequent value for that feature. For example in a dataset containing health records most people will probably not have cancer and so having cancer is something that should stand out as it indicates a state away from the norm.

Such states or behaviors we believe carry information that is more likely to surprise the user and draw attention, which could be a prelude to further actions.

If the system, for example, a distributed system with nodes, detects a necessary requirement to factor scalability into the autonomously provisioned solution and approach, then that requirement could be accommodated. In order to find unstructured text in the item description received from the user that is indicative of scaling, text mining to extract portions of the unstructured text, based on the presence of keyword(s), may be performed. NLP (Natural Language Processing) is applied to the extracted unstructured text portions in order to identify text indicative of scaling. This would allow for general practices and measures to be followed during the implementation steps. For example, the following types of words could be extracted for potential impacts pertaining to scalability. Through NLP, the system can detect and identify growth word like (but not limited to), growth, growing, increase, linear increase, trending behavior, etc. Based on the presence of text indicative of scaling, the recommended cloud features may include scaling.

In computing, scalability is a characteristic of computers, networks, algorithms, networking protocols, programs and applications. Load scalability is the ability for a distributed system to expand and contract to accommodate heavier or lighter loads, including, the ease with which a system or component can be modified, added, or removed, to accommodate changing loads, while heterogeneous scalability is the ability to adopt components from different vendors. One example is a search engine, which must support increasing numbers of users, and the number of topics it indexes.

Scaling horizontally (out/in) means adding more nodes to (or removing nodes from) a system, such as adding a new computer to a distributed software application. An example might involve scaling out from one web server to three. High-performance computing applications, such as seismic analysis and biotechnology, scale workloads horizontally to support tasks that once would have required expensive supercomputers. Other workloads, such as large social networks, exceed the capacity of the largest supercomputer and can only be handled by scalable systems. Exploiting this scalability requires software for efficient resource management and maintenance. Scaling vertically (up/down) means adding resources to (or removing resources from) a single node, typically involving the addition of processor(s), memory and/or storage to a single computer. Larger numbers of elements increases management complexity, resulting in a need for more sophisticated programming to allocate tasks among resources and handle issues such as throughput and latency across nodes, while some applications do not scale horizontally. Network function virtualization defines these terms differently: scaling out/in is the ability to scale by adding/removing resource instances (e.g., virtual machine), whereas scaling up/down is the ability to scale by changing allocated resources (e.g., memory/CPU/storage capacity).

Figure 7:
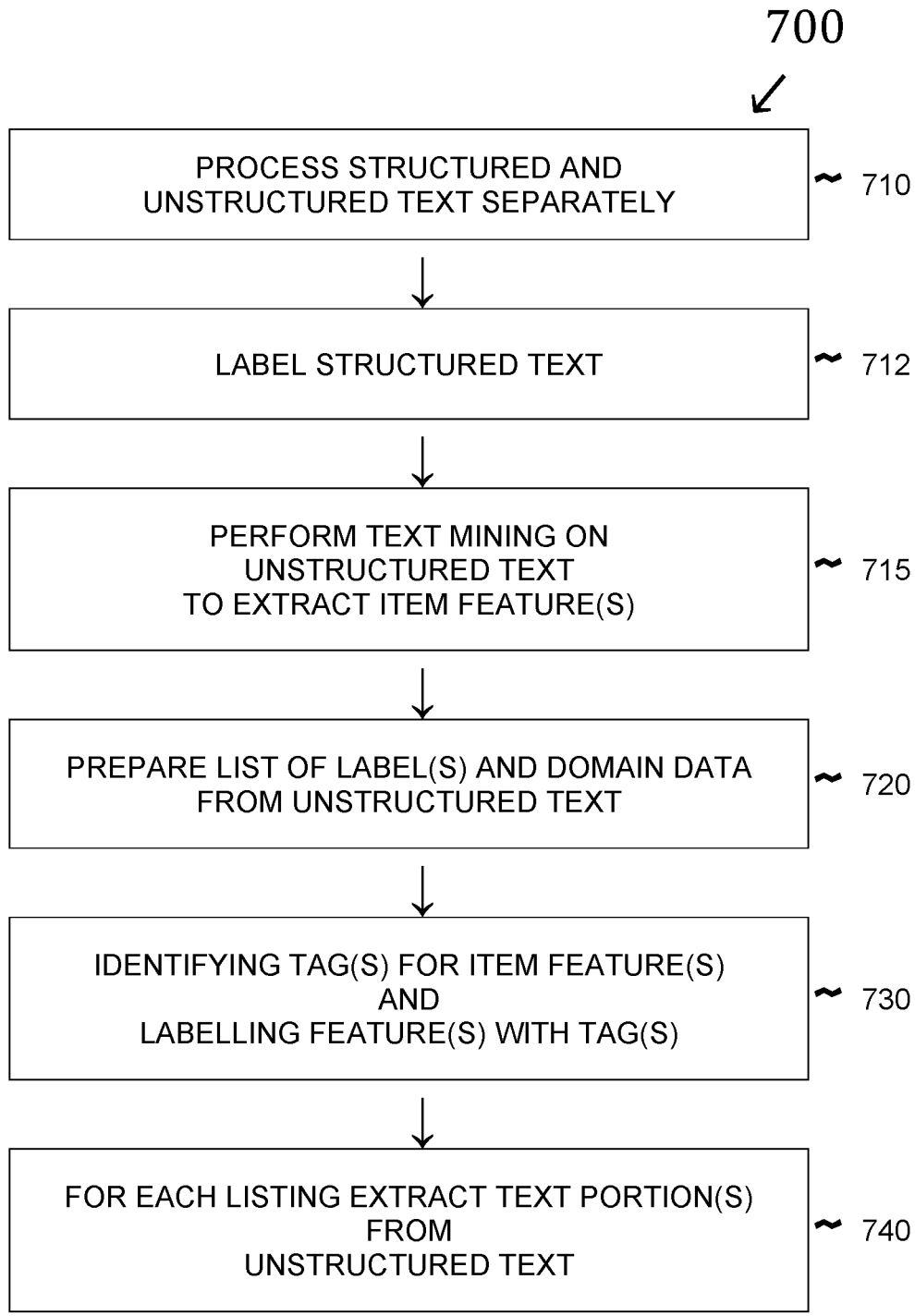
FIG. 7 is a flow diagram for one example of processing the unstructured text, in accordance with one or more aspect of the present invention.

FIG. 7 is a flow diagram 700 for one example of processing the unstructured text, in accordance with one or more aspect of the present invention. In this example, described with regard to FIG. 7, the input description document includes both unstructured and structured text. The method processes 710 the structured text and the unstructured text separately. The structured text can be processed 712 conventionally, for example, simply applying predetermined labels based on the structure. Text mining is performed 715 to extract item feature(s). Text mining, in this example, is performed by identifying 720 tags/keywords for each item feature and labelling the item features with the tags/keywords. Text is extracted and mapped to relevant tags, to identify completeness of data using these tags. For example, consider the text "number of users for XYZ application is 455 in Europe." For this text, in one example, an extracted tag could be the word "users." In another example, consider the text "The application requires software Java SDK v6.0 or below." In one example, an extracted tag could be "software" on a software platform. From the unstructured text, a list is prepared 730, the list including, for example, label(s) and domain data. For each listing on the list, the method extracts 740 text portion(s) associated with a given listing, i.e., search the unstructured text for each listing and extract a section that includes the listing. The amount of unstructured text extracted may be, for example, predetermined (e.g., a paragraph or other section including the given listing) may be extracted.

In one embodiment, there is a predetermined list of tags that are required for any specific model that is checked for completeness while applying the noted methodology. For example, after the text mining aspect, if the data for a particular tag cannot be extracted, it may be deemed to be missing, at which point an automated dialog with the user is performed to try to get such missing data if any. Thus, the completeness of the data may be evaluated using the necessary tags that are required to evaluate the application. If unable to evaluate the optimization, a chatbot API is triggered which invokes a chatbot using Rest API to ask more questions from the user in the form of dialog engagement to further extract more information from the user.

In one embodiment, should the extracting for a given listing in the prepared list result in no text portion extracted, some manner of follow up with the user is made to get that information. In one example, automated communications with the user are automatically initiated via, for example, a chat bot using, for example, a dialog-based engagement or a question-answer based engagement.

Applications for migration to a different computing environment, for example, a computing environment with cloud features, are not limited to small businesses. Enterprises may also want to migrate previously private-network-based applications, for example, a weather service relevant to a part or all of the enterprise. Such a weather application can be configured to provide weather data with respect to an area being serviced by a system. Weather data can include e.g., historical temperature data, precipitation data, wind data and weather event data. Weather data can include, e.g., current temperature data, precipitation data, wind data and weather event data. Weather data can include e.g., forecast temperature data, precipitation data, wind data and weather event data. Weather events can include, e.g., storms including hurricanes, tornados, fog formations, heat waves and cold waves. Weather service applications can store weather data associated to different subareas of an area being serviced by the system.

In one example, an item to be migrated may be a special purpose social media application, e.g., within the enterprise. A social media system can include a collection of files, including, for example, HTML files, CSS files, image files, and JavaScript files. The social media system can be, for example, a private social website with some features similar to larger public social media. Such private social networks can incorporate, for example, messaging systems that are capable of receiving and transmitting messages to client computers of participant users of the messaging systems. Messaging systems can also be incorporated in systems that that have minimal or no social network attributes. A messaging system can be provided by a short message system (SMS) text message delivery service of a mobile phone cellular network provider, or an email delivery system.

Another example of an application that may benefit from migration to solution(s) with cloud feature(s), includes a geo classification application. Such a geo classification application can associate, for example, venues to spatial coordinate ranges associated to the venues. A geo classification application can include enhanced spatial maps pre-marked with tags to indicate uses associated with map features. Map features can include venues having associated venue areas including venue building areas and/or associated venue parking areas. An enhanced map can include tag specifying usage classifications of venues, e.g., residential, business, public and the like. An enhanced map can be tagged to tag features of a map including, e.g., roads, bodies of water and infrastructure features such as building walls (exterior and interior) defining enterprise venues. In some cases, an enhanced map can be tagged so that different parts of a building are tagged differently, e.g., a doorway can be tagged differently from a conference room. Geo classification applications can provide data tags associated to locations that specify uses associated with various locations. Geo classification applications can cognitively map venues identified by venue identifiers, e.g., names, addresses, classifications, and the like, to coordinate location ranges associated to the various venues. Accordingly, the system may query a geo classification application, with location data in the form of coordinate location data, can return an identifier venue. Further, a geo classification application can cognitively map venues that are listed in geo-classification system with uses associated with such venues, e.g., whether such venues are for residential use or business use and include a variety of additional or alternative use classifications, e.g., public use, roadway use, waterway use, and the like. An enhanced map can be tagged to tag features of a map, including, e.g., roads, bodies of water and venues. Venues can be provided, e.g., by open spaces, such as developed open spaces or undeveloped open spaces, buildings such as open roof building or closed roof buildings, and/or open spaces associated to buildings, such as building associated with a parking lot. For each such venue, a geo classification application may associate, e.g., using identifiers for the venue, ranges and coordinate locations associated with the venue, features associated to the venue, such as building infrastructure features, parking lot features, and other features.

Another example of an application that may benefit from migration to solution(s) with cloud feature(s), includes a news application. Such an application can be provided by a news aggregator, e.g., a server with appropriate software for aggregating syndicated web content such as online new papers, blogs, podcasts in a central location for easy access. News applications can include, for example, a rich site summary (RSS) synchronized subscription system. RSS uses extensible markup language (XML) to structure pieces of information to be aggregated in a feed reader. Distributed updates can include, e.g., journal tables of contents, podcasts, videos, and news items. News applications can include, for example, human selected and entered content as well as automatically selected content, selected with use of auto-selection algorithms. Rich site summary (RSS) feeds can include text and metadata that specifies such information as publishing date and author name.

Some businesses may need, as part of their mission, to automatically recognize certain images and may wish to migrate the application to solution(s) with cloud feature(s), providing image recognition to the solution(s). In one example, an image recognition application may include performing digital image processing to examine spatial image data representing a feature of interest and can include employing pattern recognition processing using one or more of, e.g., feature extraction algorithms, classification algorithms, and/or clustering algorithms. In one example, an image recognition application can include performing of digital image processing. Digital image processing can include, e.g., filtering, edge detection, shape classification, optical character recognition (OCR), and/or encoded information decoding.

Certain embodiments herein may offer various technical computing advantages involving computing advantages to address problems arising in the realm of computer networks. Particularly, computer networks operating to provide recommendations for migrating item(s), for example, applications, to a different computing environment, for example, a computing environment with cloud features, based on machine understanding of text-based documents describing the item(s). A fundamental aspect of operation of a computer system is its interoperation to which it operates including human actors. By increasing the accuracy and reliability of information presented to human users, embodiments herein increase the level of engagement of human users for enhanced computer system operation. Embodiments herein can include performing text mining of unstructured text, which may be processed separate from the structured text, in a text-based description of an item under consideration by a user for migration, the text mining extracting, for example, item feature(s) such as, for example, a geographical limitation. Embodiments herein may include, for example, extracting portions of the unstructured text, from which entities can be identified using, in one example, NLP to understand the context surrounding an entity in the unstructured text and predicting an entity therefrom. Embodiments herein can include mapping item features or entities to various cloud features available from cloud solutions offered by cloud providers. Embodiments herein can include automatically recommending available cloud features based on the mapping for optional consideration by the user. Further, embodiments herein can include automatically providing with such a recommendation, an explanation to the user for the recommendation of a given available cloud feature.

Embodiments herein can also initially formulate such a recommendation, validate the formulated recommendation against one or more explainability model (to provide the explanation noted above), using, in one example, a data store of known limitations and inflection points in performance, i.e., reductions in performance for the various solutions with cloud feature(s), and providing the validated recommendation to the user via, for example, a user interface, for consideration by the user.

Embodiments herein include using natural language processing on extracted unstructured text to identify entities.

Embodiments herein may include user-requested item feature(s) along with those from text mining.

Embodiments herein may further include, for example, performing, for the unstructured text, text mining to extract portion(s) of the unstructured text and applying natural language processing to identify text indicative of scaling item feature(s) (e.g., dynamically increasing the number of virtual machines for load balancing, as needed) and including scaling as a part of the recommended cloud feature(s).

Embodiments herein include processing structured and unstructured text from the item description separately, preparing a list from the unstructured text of label(s) for the item feature(s) and tag(s), identifying a tag for each item feature and labelling the item feature(s) with the tag(s), and for each listing on the list extracting a portion of unstructured text from the item description(s). Embodiments herein include, where the extracting for a given listing results in no unstructured text being extracted (because the system did not find any relevant text), automatically initiating automated communication with the user to match the text to that listing.

Various decision data structures can be used to drive artificial intelligence (AI) decision making, such as decision data structure that cognitively maps item features to available cloud features from solutions of various providers, in order to provide a recommendation to the user for optional consideration. Explainability model(s) can provide a reasoning for a particular recommendation. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g., processing for transforming unstructured data into a form optimized for computerized processing. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription.

In a first aspect, disclosed above is a computer-implemented method. The computer-implemented method includes: receiving text from a user describing item(s) for migration to a computing environment with cloud feature(s), resulting in item description(s), the text including structured text and unstructured text; performing text mining on the unstructured text to extract item feature(s); extracting portion(s) of the unstructured text, resulting in extracted text portion(s); identifying, from each of the extracted text portion(s), a corresponding entity; mapping the entity(ies) or the item feature(s) to one or more cloud feature available from solution(s) with cloud feature(s), resulting in mapped cloud feature(s); and based on the mapped cloud feature(s), automatically recommending to the user at least one of the mapped cloud feature(s), resulting in recommended cloud feature(s) for optional consideration by the user.

In one example, the automatically recommending of the computer-implemented method of the first aspect includes: formulating recommendation(s) of at least one of the mapped cloud feature(s), resulting in formulated recommendation(s); validating the formulated recommendation(s) against explainability model(s) using, for example, a data store of known limitations and performance inflection points for the solution(s) with cloud feature(s), resulting in validated recommendation(s), wherein an output of the explainability model provides a reasoning for the at least one recommended cloud feature; and providing the validated recommendation(s) to the user via a user interface for optional consideration thereby.

In one example, identifying the entity(ies) of the computer-implemented method of the first aspect includes using natural language processing for each extracted text portion.

In one example, the item feature(s) of the computer-implemented method of the first aspect includes requested item feature(s) from the user.

In one example, the computer-implemented method further includes performing text mining again on the unstructured text to extract unstructured text portion(s) of the unstructured text and applying natural language processing to identify text indicative of scaling item feature(s) and including scaling as a part of the recommended cloud feature(s).

In one example, the computer-implemented method further includes: processing the structured text and unstructured text separately; preparing, from the unstructured text, a list, the list having a plurality of listings comprising labels for the item feature(s) and domain data; identifying tag(s) for each of the item feature(s) and labelling the item feature(s) with the tag(s); the extracting including extracting, for each of the plurality of listings on the list, a portion of the unstructured text, resulting in extracted text portions for the plurality of listings.

In one example, for listing(s) on the list, the extracting yields no extracted text, the computer-implemented method further including automatedly communicating with the user to match a corresponding text portion with the listing(s) that yielded no extracted text.

In one example, a distributed system with a plurality of nodes and a plurality of resources may be employed for performing the computer-implemented method. The computer-implemented method further includes, for example, based on a presence of one or more keyword, performing text mining again on the unstructured text to extract one or more unstructured text portion of the unstructured text, resulting in at least one extracted unstructured text portion; applying, to each of the at least one extracted unstructured text portion, natural language processing to identify text indicative of scaling; based on the presence of such text indicative of scaling, the at least one recommended cloud feature may include scaling; the scaling includes at least one of adding one or more node to the distributed system, removing one or more node from the distributed system, adding one or more resource to one of the plurality of nodes and removing one or more resource from one of the plurality of nodes.

In one example, identifying entities in the computer-implemented method may include preparing a list of information to be used in identifying an entity, the list including a plurality of listings. The list of information may include, for example, at least one label, at least one domain data and at least one item feature. The method further includes, for example, for each listing, extracting a predetermined amount of the unstructured text that includes a predetermined tag, resulting in a plurality of extracted unstructured text portions. The method also includes, for example, applying natural language processing to each of the plurality of extracted unstructured text portions to understand a context thereof, and predicting for each of the plurality of unstructured text portions, an entity based on the context.

In one example, the automatically recommending of the computer-implemented method of the first aspect may include, for example: formulating at least one recommendation of at least one of the one or more mapped cloud feature, resulting in one or more formulated recommendation. The method further includes, for example, validating the one or more formulated recommendation against at least one explainability model using a data store of a plurality of known limitations and performance inflection points for the one or more solution, resulting in at least one validated recommendation. The method also includes, for example, assigning one or more feature importance score based on the at least one explainability model to the at least one of the one or more mapped cloud feature; providing the at least one validated recommendation to the user via a user interface for optional consideration thereby; and providing the one or more feature importance score to the user via the user interface, wherein the one or more feature importance score provides a reasoning for the at least one validated recommendation.

In one example, the plurality of cloud features of the computer-implemented method may be predetermined. The method further includes, for example, storing in a mapping database successful results of mapping the one or more item feature or the one or more entity to cloud feature(s), resulting in stored mapping results; and periodically applying machine learning using the stored mapping results to iteratively improve the mapping.

In a second aspect, disclosed above is a system including a memory; processor(s) in communication with the memory; and program instructions executable by the processor(s) via the memory to perform a method. The method includes: receiving text from a user describing item(s) for migration to a computing environment with cloud feature(s), resulting in item description(s), the text including structured text and unstructured text; performing text mining on the unstructured text to extract item feature(s); extracting portion(s) of the unstructured text, resulting in extracted text portion(s); identifying, from each of the extracted text portion(s), a corresponding entity, resulting entity(ies); mapping the entity(ies) or the item feature(s) to cloud feature(s) available from cloud solution(s), resulting in mapped cloud feature(s); and based on the mapped cloud feature(s), automatically recommending to the user at least one of the mapped cloud feature(s), resulting in recommended cloud feature(s) for optional consideration by the user.

In one example, the automatically recommending in the method of the system of the second aspect includes: formulating recommendation(s) of at least one of the mapped cloud feature(s), resulting in formulated recommendation(s); validating the formulated recommendation(s) against explainability model(s) using, for example, a data store of known limitations and performance inflection points for the solution(s) with cloud feature(s), resulting in validated recommendation(s), wherein an output of at least one of the explainability model(s) provides a reasoning for the at least one recommended cloud feature; and providing the validated recommendation(s) to the user via a user interface for consideration thereby.

In one example, identifying the entity(ies) includes using natural language processing for each extracted text portion.

In one example, the item feature(s) includes requested item feature(s) from the user.

In one example, the method of the system of the second aspect further includes performing text mining again on the unstructured text to extract unstructured text portion(s) of the unstructured text and applying natural language processing to identify text indicative of scaling item feature(s) and including scaling as a part of the recommended cloud feature(s).

In one example, the method of the system of the second aspect further includes: processing the structured text and unstructured text separately; preparing, from the unstructured text, a list, the list having listings including labels for the item feature(s) and domain data; identifying tag(s) for each of the item feature(s) and labelling the item feature(s) with the tag(s); the extracting including extracting, for each listing on the list, a portion of the unstructured text, resulting in an extracted text portions for the listings.

In one example, for listing(s) on the list, the extracting yields no extracted text, the method further includes automatedly communicating with the user to match a corresponding text portion with the listing(s) yielding no extracted text.

In a third aspect, disclosed above is a computer program product including a computer readable storage medium readable by processor(s) and storing instructions for execution by the processor(s) for performing a method. The method includes: receiving text from a user describing item(s) for migration to a computing environment with cloud feature(s), resulting in item description(s), the text including structured text and unstructured text; performing text mining on the unstructured text to extract item feature(s); extracting portion(s) of the unstructured text, resulting in extracted text portion(s); identifying, from each of the extracted text portion(s), a corresponding entity; mapping the entity(ies) or the item feature(s) to cloud feature(s) available from solution(s) with cloud feature(s), resulting in mapped cloud feature(s); and based on the mapped cloud feature(s), automatically recommending to the user at least one of the mapped cloud feature(s) for optional consideration by the user.

In one example, the automatically recommending of the method of the third aspect includes: formulating recommendation(s) of at least one of the mapped cloud feature(s), resulting in formulated recommendation(s); validating the formulated recommendation(s) against explainability model(s) using, for example, a data store of known limitations and performance inflection points for the solution(s) with cloud feature(s), resulting in validated recommendation(s), wherein an output of the explainability model provides a reasoning for the at least one recommended cloud feature; and providing the validated recommendation(s) to the user via a user interface for optional consideration thereby.

Various available tools, libraries, and/or services can be utilized for implementation of a predictive model. For example, a machine learning service can provide access to libraries and executable code for support of machine learning functions. A machine learning service can provide access to a set of REST APIs that can be called from any programming language and that permit the integration of predictive analytics into any application. Enabled REST APIs can provide, e.g., retrieval of metadata for a given predictive model, deployment of models and management of deployed models, online deployment, scoring, batch deployment, stream deployment, monitoring and retraining deployed models. According to one possible implementation, a machine learning service can provide access to various libraries. A machine learning service can provide access to a set of REST APIs that can be called from any programming language and that permit the integration of predictive analytics into any application. Enabled REST APIs can provide, e.g., retrieval of metadata for a given predictive model, deployment of models and management of deployed models, online deployment, scoring, batch deployment, stream deployment, monitoring and retraining deployed models. Training a predictive model can include use of, e.g., support vector machines (SVM), Bayesian networks, neural networks and/or other machine learning technologies.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

Figure 3A:
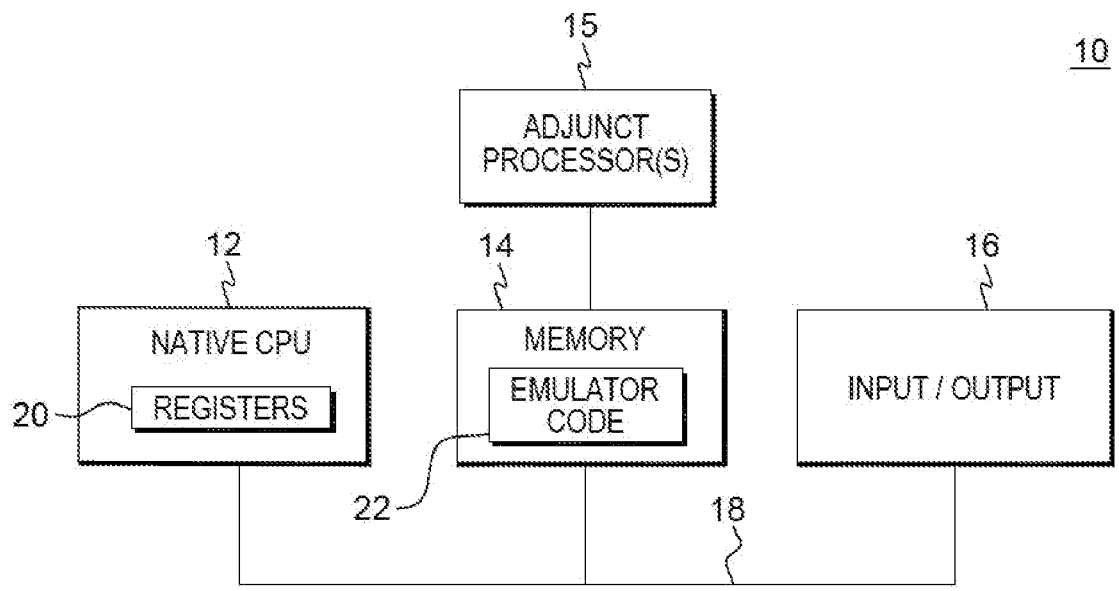
FIG. 3A is a block diagram of one example of a system that can be used, in accordance with one or more aspect of the present invention.

Aspects of the present invention may be used by many types of computing environments. Another embodiment of a computing environment to incorporate and use one or more aspects of the present invention is described with reference to FIG. 3A. In this example, a computing environment 10 includes, for instance, a native central processing unit (CPU) 12 or just, "CPU 12", a memory 14, and one or more input/output devices and/or interfaces 16 coupled to one another via, for example, one or more buses 18 and/or other connections.

Central processing unit 12 includes one or more registers 20, such as one or more general purpose registers and/or one or more special purpose registers used during processing within the environment. These registers include information that represents the state of the environment at any particular point in time.

Moreover, central processing unit 12 executes instructions and code that are stored in memory 14. In one particular example, the central processing unit executes emulator code 22 stored in memory 14. This code enables the computing environment configured in one architecture to emulate another architecture. For instance, emulator code 22 allows machines based on architectures other than the z/Architecture instruction set architecture, such as PowerPC processors, HP Superdome servers or others, to emulate the z/Architecture instruction set architecture and to execute software and instructions developed based on the z/Architecture instruction set architecture.

Figure 3B:
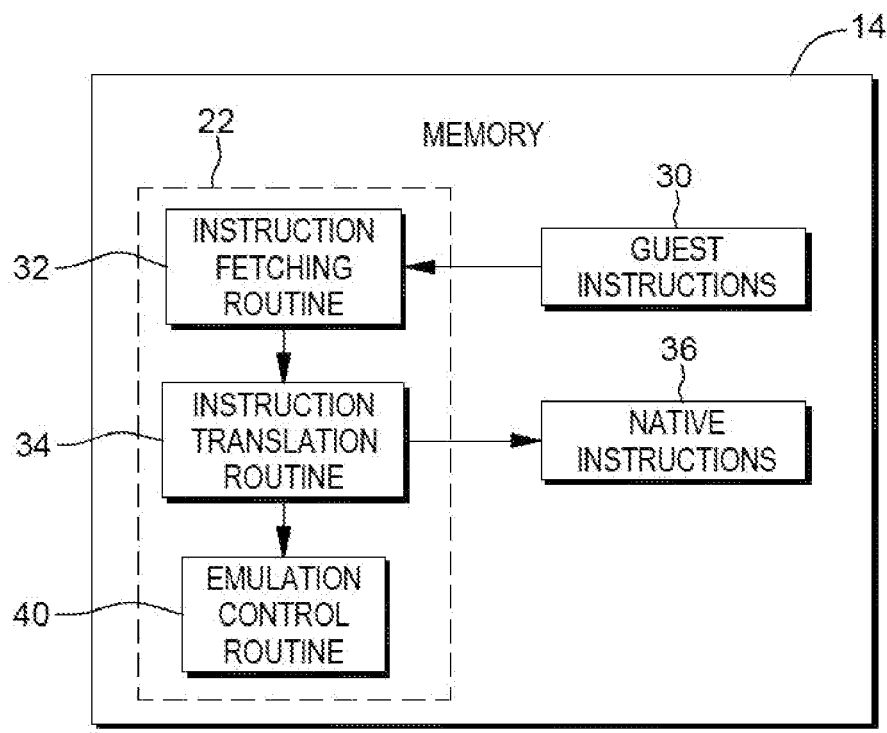
FIG. 3B depicts further details of the memory of FIG. 3A, in accordance with one or more aspects of the present invention.

Further details relating to emulator code 22 are described with reference to FIG. 3B. Guest instructions 30 stored in memory 14 comprise software instructions (e.g., correlating to machine instructions) that were developed to be executed in an architecture other than that of CPU 12. For example, guest instructions 30 may have been designed to execute on a processor based on the z/Architecture instruction set architecture, but instead, are being emulated on CPU 12, which may be, for example, an Intel Itanium II processor. In one example, emulator code 22 includes an instruction fetching routine 32 to obtain one or more guest instructions 30 from memory 14, and to optionally provide local buffering for the instructions obtained. It also includes an instruction translation routine 34 to determine the type of guest instruction that has been obtained and to translate the guest instruction into one or more native instructions 36. This translation includes, for instance, identifying the function to be performed by the guest instruction and choosing the instruction(s) to perform that function.

Further, emulator code 22 includes an emulation control routine 40 to cause the instructions to be executed. Emulation control routine 40 may cause CPU 12 to execute a routine of instructions that emulate one or more previously obtained guest instructions and, at the conclusion of such execution, return control to the instruction fetch routine to emulate the obtaining of the next guest instruction or a group of guest instructions. Execution of the instructions 36 may include loading data into a register from memory 14; storing data back to memory from a register; or performing some type of arithmetic or logic operation, as determined by the translation routine.

Each routine is, for instance, implemented in software, which is stored in memory and executed by central processing unit 12. In other examples, one or more of the routines or operations are implemented in firmware, hardware, software or some combination thereof. The registers of the emulated processor may be emulated using registers 20 of the CPU or by using locations in memory 14. In embodiments, guest instructions 30, instructions 36 and emulator code 22 may reside in the same memory or may be disbursed among different memory devices.

An instruction, command or call that may be emulated includes the Ultravisor Calls described herein, in accordance with one or more aspects of the present invention. Further, other instructions, commands, functions, operations, calls and/or one or more aspects of the present invention may be emulated, in accordance with one or more aspects of the present invention.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto a cloud-based infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the infrastructure is operated solely for an organization. It may be managed by the organization or a third party and may exist on-premises or off-premises.

Community cloud: the infrastructure is shared by several organizations and supports a specific community that has shared concerns (e.g., mission, security requirements, policy, and compliance considerations). It may be managed by the organizations or a third party and may exist on-premises or off-premises.

Public cloud: the infrastructure is made available to the general public or a large industry group and is owned by an organization selling cloud services.

Hybrid cloud: the infrastructure is a composition of two or more services with cloud feature(s) (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
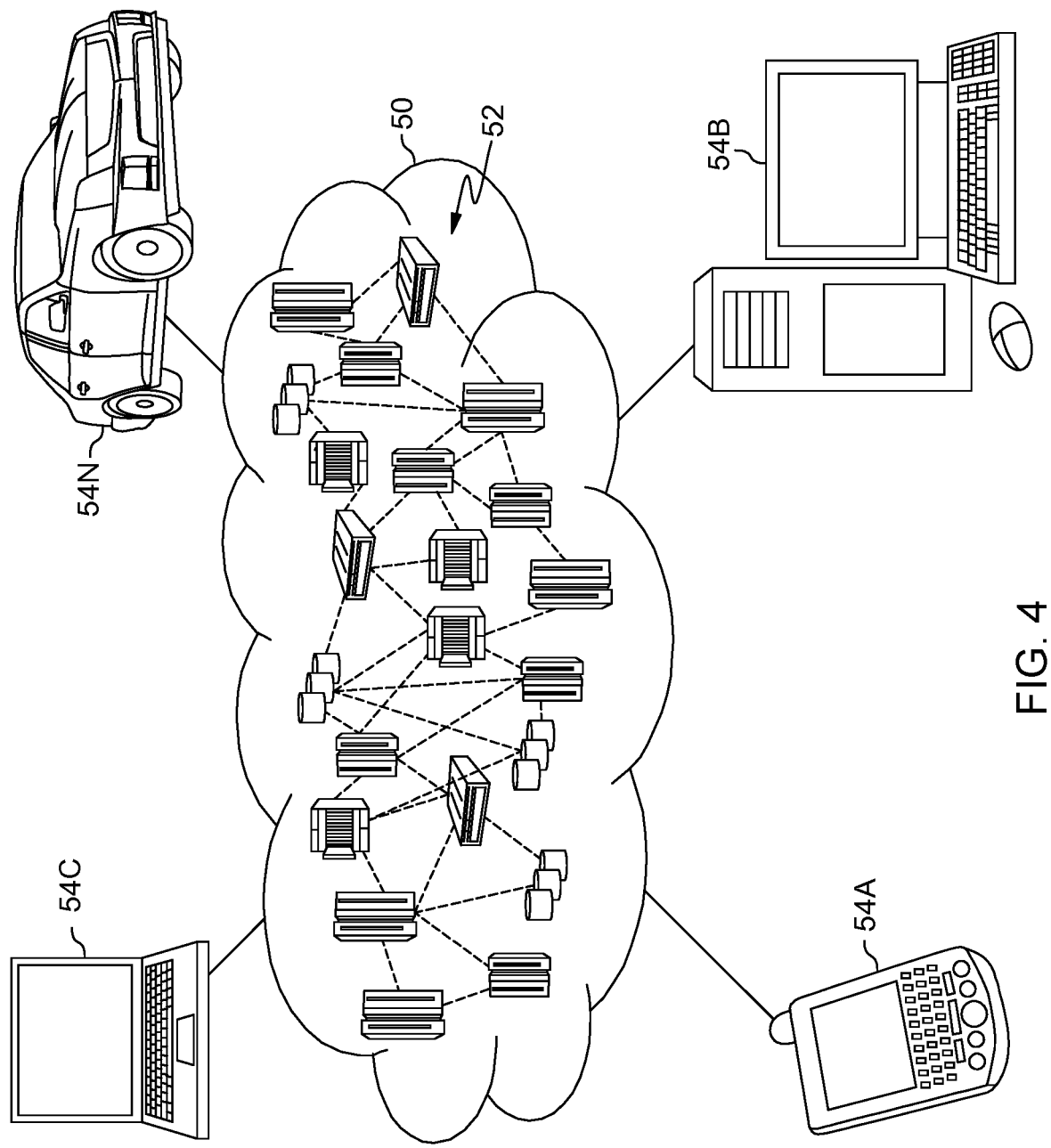
FIG. 4 depicts one embodiment of a cloud computing environment, in accordance with one or more aspects of the present invention.

Referring now to FIG. 4, one example of a cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 52 and cloud computing environment 50 can communicate with any type of computerized device over any type of network and/or network addressable connection (e.g., using a web browser).

Figure 5:
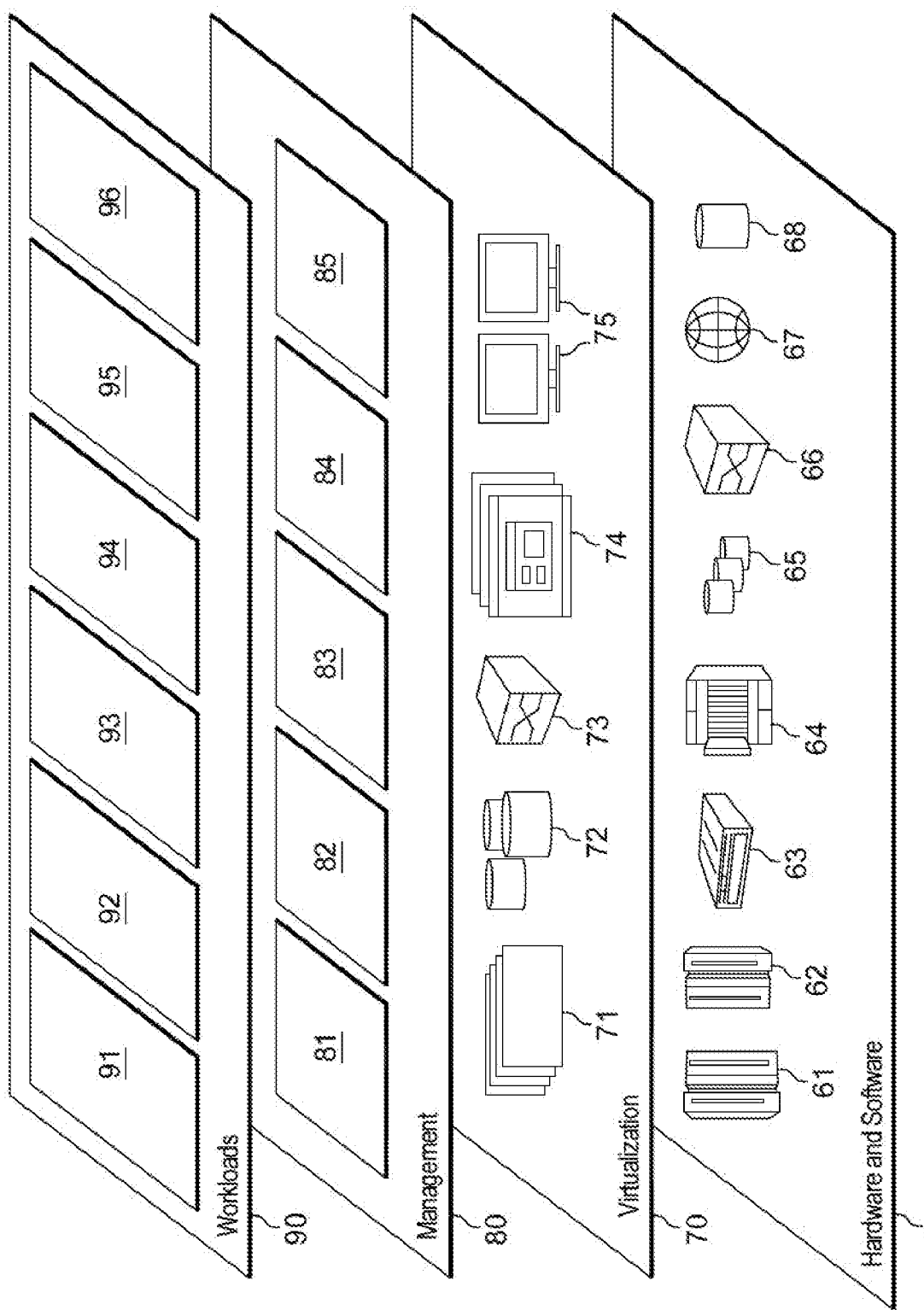
FIG. 5 depicts one example of abstraction model layers, in accordance with one or more aspects of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secure virtual machine dump processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For instance, computing environments of other architectures can be used to incorporate and/or use one or more aspects. Further, different instructions, commands, functions, calls and/or operations may be used. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

What is claimed is:

1. A computer-implemented method, comprising:
  receiving text from a user describing at least one item for migration to a computing environment with one or more cloud feature, resulting in one or more item description, wherein the text comprises unstructured text;
  performing text mining on the unstructured text to extract one or more item feature;
  extracting one or more portion of the unstructured text, resulting in at least one extracted text portion;
  identifying, from each of the at least one extracted text portion, a corresponding entity, resulting in one or more entity;
  mapping one of the one or more entity and the one or more item feature to one or more of a plurality of cloud features available from one or more solution, resulting in one or more mapped cloud feature;
  based on the one or more mapped cloud feature, automatically recommending to the user at least one of the one or more mapped cloud feature, resulting in at least one recommended cloud feature for optional consideration by the user, wherein the at least one recommended cloud feature comprises scaling having an increased number of processors and increased memory compared to a previous computing environment;
  inputting (i) the at least one recommended cloud feature of the at least one of the one or more mapped cloud feature and (ii) a data store of known limitations and known performance degradations into an explainability model to output a reasoning for the at least one recommended cloud feature, wherein feature importance scores are assigned to each of the plurality of cloud features and are displayed to the user in a graphical user interface, wherein the feature importance scores denote an optimal cloud provider and a distribution of the plurality of cloud features;
  migrating a high-performance computing application from the previous computing environment to the at least one recommended cloud feature in the computing environment having the increased number of processors and the increased memory compared to the previous computing environment; and
  executing the high-performance computing application in the at least one recommended cloud feature based on output of the reasoning of the explainability model.

2. The computer-implemented method of claim 1, wherein the automatically recommending comprises:
  formulating at least one recommendation of at least one of the one or more mapped cloud feature, resulting in one or more formulated recommendation;
  validating the one or more formulated recommendation against the explainability model, resulting in at least one validated recommendation; and
  providing the at least one validated recommendation to the user via a user interface for optional consideration thereby.

3. The computer-implemented method of claim 1, wherein the identifying comprises using natural language processing for each of the at least one extracted text portion.

4. The computer-implemented method of claim 1, wherein the one or more item feature comprises at least one requested item feature from the user.

5. The computer-implemented method of claim 1, further comprising performing text mining again on the unstructured text to extract one or more unstructured text portion of the unstructured text and applying natural language processing to identify text indicative of scaling at least one item feature and including scaling as a part of the at least one recommended cloud feature.

6. The computer-implemented method of claim 1, further comprising:
preparing, from the unstructured text, a list, the list having a plurality of listings comprising labels for the one or more item feature and domain data;
identifying one or more tag for each of the one or more item feature and labelling the each of the one or more item feature with the one or more tag; and
wherein the extracting comprises extracting, for each of the plurality of listings on the list, a portion of the unstructured text, resulting in extracted text portions for the plurality of listings.

7. The computer-implemented method of claim 6, wherein, for at least one listing of the plurality of listings, the extracting yielding no extracted text, the method further comprising automatedly communicating with the user to match a corresponding text portion with the at least one listing.

8. The computer-implemented method of claim 1, wherein a distributed system with a plurality of nodes and a plurality of resources performs the computer-implemented method, the computer-implemented method further comprising:
based on a presence of one or more key word, performing text mining again on the unstructured text to extract one or more unstructured text portion of the unstructured text, resulting in at least one extracted unstructured text portion;
applying, to each of the at least one extracted unstructured text portion, natural language processing to identify text indicative of scaling;
wherein, based on a presence of text indicative of scaling, the at least one recommended cloud feature comprises scaling; and
wherein the scaling comprises at least one of adding one or more node to the distributed system, removing one or more node from the distributed system, adding one or more resource of the plurality of resources of the plurality of resources to one of the plurality of nodes and removing one or more resource of the plurality of resources from one of the plurality of nodes.

9. The computer-implemented method of claim 1, wherein the identifying comprises:
preparing a list of information to be used in identifying an entity, the list of information comprising a plurality of listings, wherein the list of information comprises at least one label, at least one domain data and at least one item feature;
for each of the plurality of listings, extracting a predetermined amount of the unstructured text that includes a predetermined tag, resulting in a plurality of extracted unstructured text portions;
applying natural language processing to each of the plurality of extracted unstructured text portions to understand a context thereof, and
predicting, for each of the plurality of extracted unstructured text portions, an entity based on the context.

10. The computer-implemented method of claim 1, wherein the automatically recommending comprises:
formulating at least one recommendation of at least one of the one or more mapped cloud feature, resulting in one or more formulated recommendation;
validating the one or more formulated recommendation against at least one explainability model using a data store of a plurality of known limitations and performance inflection points for the one or more solution, resulting in at least one validated recommendation;
assigning one or more feature importance score based on the at least one explainability model to the at least one of the one or more mapped cloud feature;
providing the at least one validated recommendation to the user via a user interface for optional consideration thereby; and
providing the one or more feature importance score to the user via the user interface, wherein the one or more feature importance score provides a reasoning for the at least one validated recommendation.

11. The computer-implemented method of claim 1, wherein the plurality of cloud features are predetermined, the computer-implemented method further comprising:
storing in a mapping database successful results of mapping the one or more entity or the one or more item feature to the one or more of a plurality of cloud features, resulting in stored mapping results; and
periodically applying machine learning using the stored mapping results to iteratively improve the mapping.

12. The computer-implemented method of claim 1, wherein the reasoning, output by the explainability model, for the at least one recommended cloud feature comprises an explanation of how requirements of the one or more cloud feature are mapped to the one or more entity to achieve a recommendation of the at least one recommended cloud feature.

13. A system comprising:
a memory; and
at least one processor in communication with the memory; and
program instructions executable by the at least one processor via the memory to perform a method, comprising:
receiving text from a user describing at least one item for migration to a computing environment with one or more cloud feature, resulting in one or more item description, wherein the text comprises unstructured text;
performing text mining on the unstructured text to extract one or more item feature;
extracting one or more portion of the unstructured text, resulting in at least one extracted text portion;
identifying, from each of the at least one extracted text portion, a corresponding entity, resulting in one or more entity;
mapping one of the one or more entity and the one or more item feature to one or more of a plurality of cloud features available from one or more solution, resulting in one or more mapped cloud feature;
based on the one or more mapped cloud feature, automatically recommending to the user at least one of the one or more mapped cloud feature, resulting in at least one recommended cloud feature for optional consideration by the user, wherein the at least one recommended cloud feature comprises scaling having an increased number of processors and increased memory compared to a previous computing environment;
inputting (i) the at least one recommended cloud feature of the at least one of the one or more mapped cloud feature and (ii) a data store of known limitations and known performance degradations into an explainability model to output a reasoning for the at least one recommended cloud feature, wherein feature importance scores are assigned to each of the plurality of cloud features and are displayed to the user in a graphical user interface, wherein the feature importance scores denote an optimal cloud provider and a distribution of the plurality of cloud features;
migrating a high-performance computing application from the previous computing environment to the at least one recommended cloud feature in the computing environment having the increased number of processors and the increased memory compared to the previous computing environment; and
executing the high-performance computing application in the at least one recommended cloud feature based on output of the reasoning of the explainability model.

14. The system of claim 13, wherein the identifying comprises using natural language processing for each of the at least one extracted text portion.

15. The system of claim 13, wherein the one or more item feature comprises at least one requested item feature from the user.

16. The system of claim 13, further comprising performing text mining again on the unstructured text to extract one or more unstructured text portion of the unstructured text and applying natural language processing to identify text indicative of scaling at least one item feature and including scaling as a part of the at least one recommended cloud feature.

17. The system of claim 13, further comprising:
preparing, from the unstructured text, a list, the list having a plurality of listings comprising labels for the one or more item feature and domain data;
identifying one or more tag for each of the one or more item feature and labelling the each of the one or more item feature with the one or more tag; and
wherein the extracting comprises extracting, for each of the plurality of listings on the list, a portion of the unstructured text, resulting in an extracted text portions for the plurality of listings.

18. The system of claim 17, wherein, for at least one listing of the plurality of listings, the extracting yielding no extracted text, the method further comprising automatedly communicating with the user to match a corresponding text portion with the at least one listing.

19. A computer program product, comprising:
a computer readable storage medium readable by one or more processor and storing instructions for execution by the one or more processor for performing a method comprising:
receiving text from a user describing at least one item for migration to a computing environment with one or more cloud feature, resulting in one or more item description, wherein the text comprises unstructured text;
performing text mining on the unstructured text to extract one or more item feature;
extracting one or more portion of the unstructured text, resulting in at least one extracted text portion;
identifying, from each of the at least one extracted text portion, a corresponding entity, resulting in one or more entity;
mapping one of the one or more entity and the one or more item feature to one or more of a plurality of cloud features available from one or more solution, resulting in one or more mapped cloud feature;
based on the one or more mapped cloud feature, automatically recommending to the user at least one of the one or more mapped cloud feature, resulting in at least one recommended cloud feature for optional consideration by the user, wherein the at least one recommended cloud feature comprises scaling having an increased number of processors and increased memory compared to a previous computing environment;
inputting (i) the at least one recommended cloud feature of the at least one of the one or more mapped cloud feature and (ii) a data store of known limitations and known performance degradations into an explainability model to output a reasoning for the at least one recommended cloud feature, wherein feature importance scores are assigned to each of the plurality of cloud features and are displayed to the user in a graphical user interface, wherein the feature importance scores denote an optimal cloud provider and a distribution of the plurality of cloud features;
migrating a high-performance computing application from the previous computing environment to the at least one recommended cloud feature in the computing environment having the increased number of processors and the increased memory compared to the previous computing environment; and
executing the high-performance computing application in the at least one recommended cloud feature based on output of the reasoning of the explainability model.

* * * * *